United States Patent [19]

Lag

[11] Patent Number: 5,312,006
[45] Date of Patent: May 17, 1994

[54] FOLDABLE CARRIAGE RACK

[76] Inventor: Fang-Hoang Lag, No. 461, Jiun Her Street, Taichung, Taiwan

[21] Appl. No.: 892,028

[22] Filed: Jun. 2, 1992

[51] Int. Cl.$^5$ ............................................. B62B 1/04
[52] U.S. Cl. ................................. 211/195; 280/646; 280/47.29
[58] Field of Search ............... 211/195, 201, 202, 104; 280/47.2, 47.24, 645, 646, 639, 47.29; 108/99; 248/129

[56] References Cited

U.S. PATENT DOCUMENTS

| | | | |
|---|---|---|---|
| 3,659,867 | 5/1972 | Curry | 280/645 |
| 4,362,307 | 12/1982 | Nakatani | 280/30 |
| 4,917,392 | 4/1990 | Ambasz | 280/47.29 X |
| 4,969,660 | 11/1990 | Spak | 280/646 |
| 4,993,727 | 2/1991 | vom Braucke et al. | 280/47.29 X |
| 5,072,958 | 12/1991 | Young | 280/47.29 X |

Primary Examiner—Paula A. Bradley
Assistant Examiner—Jeanne M. Elpel
Attorney, Agent, or Firm—Bacon & Thomas

[57] ABSTRACT

A carriage rack has two posts, two swivel arms, two elastic elements, a luggage holding rod, a bracket, and casters. The two posts are spaced in a parallel manner and provided with pivoting portion. Each of swivel arms is composed of a cylindrical portion and inner and outer lugs extending rearwards from the cylindrical portion, which is provided with an opening. The inner lug is furnished with a recess, a slant, and a baffle. The swivel arm is fastened to the bottom end of the post by means of its cylindrical portion which receives the post in such a manner that the pivoting portion of the post extends out of the opening of the cylindrical portion so as to permit the positioning of the swivel angle of the swivel arm. The elastic elements are used to drive the two swivel arms to move. The luggage holding rod has two upright legs pivotally fastened to the pivoting portions of the posts in such a manner that they urge the slants of inner lugs of the swivel arms so as to enable the swivel arms to move outwards. The bracket is fastened to the luggage holding rod in such a way that it keeps the two upright legs of the luggage holding rod to remain perpendicular to ground surface at the time when the carriage rack is in use.

3 Claims, 4 Drawing Sheets

FOLDABLE CARRIAGE RACK

BACKGROUND OF THE INVENTION

The present invention relates to a carriage rack, and more particularly to a foldable carriage rack provided with casters capable of being drawn together along with the rack so as to make the carriage rack more compact for easy storage.

A carriage rack is a rather convenient adjunct for travelers in general and frequent travelers in particular. The conventional carriage rack of prior art is generally defective in design in that it can not be easily folded and that it can not be effectively made more compact for easy storage.

SUMMARY OF THE INVENTION

It is, therefore, the primary objective of the present invention to provide a carriage rack with an improved structure enabling the carriage rack, along with its casters, to be folded and spread out easily.

It is another objective of the present invention to provide a carriage rack with an improved structure capable of making the folded carriage rack more compact for easy storage.

In keeping with the principles of the present invention, the foregoing objectives of the present invention are accomplished by a carriage rack, which comprises two posts, two swivel arms, two elastic elements, a luggage holding rod, and a bracket. The two posts are parallel to each other and provided with pivoting portions facing each other. Each of the swivel arms is composed of an upright cylindrical portion and inner and outer lugs extending rearwards from the cylindrical portion. The cylindrical portion is provided with an opening of a predetermined size, while the inner lug is furnished in the inner wall thereof with a recess, a slant and a baffle. The swivel arm is fastened to the bottom end of the post by means of its cylindrical portion which receives the post in such a manner that the pivoting portion of the post extends out of the opening of the cylindrical portion so as to permit the positioning of the swivel angle of the swivel arm. The elastic elements are used to drive the two swivel arms to move inwardly. The luggage holding rod has two upright legs pivotally fastened to the pivoting portions of the posts in such a manner that they urge the slants of inner lugs of the swivel arms so as to enable the swivel arms to move outwards. The U-shaped bracket is fastened to the luggage holding rod in such a way that it keeps the two upright legs of luggage holding rod to remain perpendicular to a ground surface at the time when the carriage rack is at work.

The foregoing objectives, feature and functions of the present invention will be better understood by studying the following detailed description of a preferred embodiment of the present invention in conjunction with the drawings provided herewith.

DETAILED DESCRIPTION OF THE PREFERRED EMBODIMENT

Figure 1:
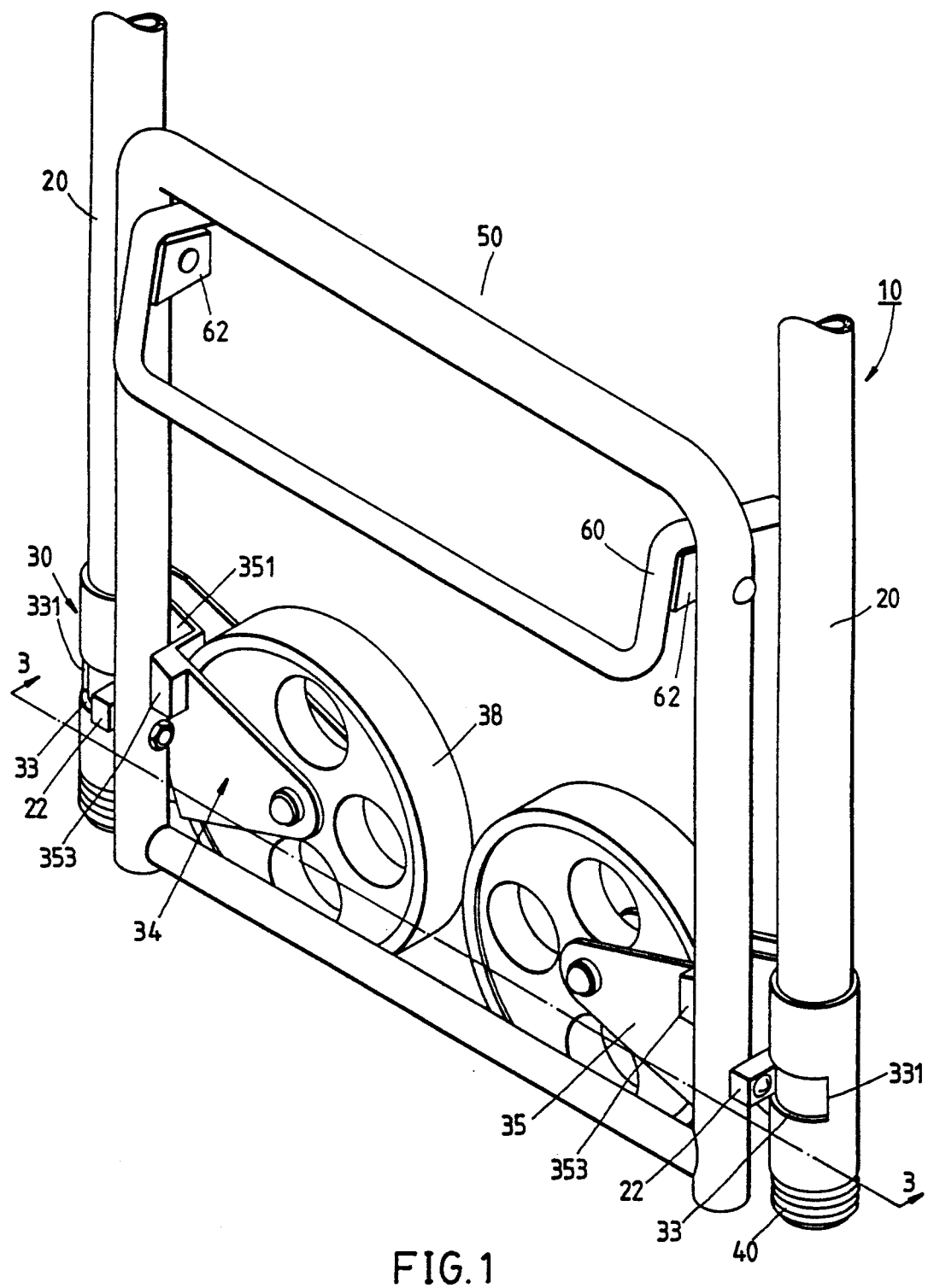
FIG. 1 shows a three-dimensional view of a carriage rack of the present invention in a folded state.
Figure 2:
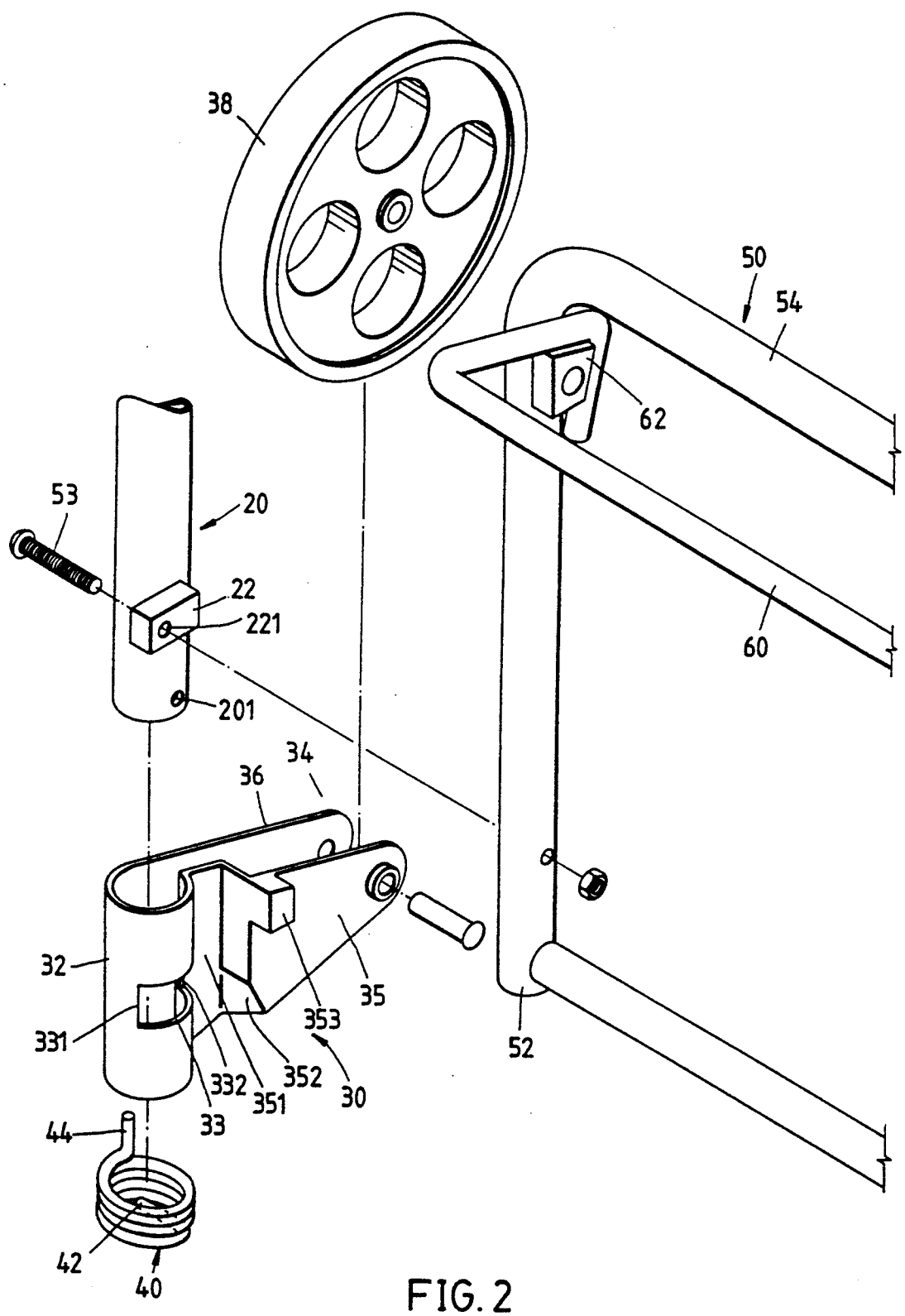
FIG. 2 shows an exploded view of a portion of the carriage rack as shown in FIG. 1.

Referring to FIGS. 1 and 2, a carriage rack 10 embodied in the present invention is shown comprising two posts 20, two swivel arms 30, two elastic elements 40, one luggage holding rod 50, and one bracket 60.

The two spaced and upright posts 20 are arranged in a parallel manner. Each post 20 is provided with a pivoting portion 22 of rectangular shape located at inner side of the bottom thereof. In other words, the two pivoting portions 22 of the two posts are arranged in such a manner that they face each other.

Each of the two swivel arms 30 comprises an upright cylindrical portion 32 and two lugs 34 extending from the cylindrical portion 32 rearwards and vertically along a direction tangential to the circumference of the cylindrical portion 32. The swivel arm 30 is fastened to the bottom end of the post 20 by means of the cylindrical portion 32 which is dimensioned to fit over the post 20. The cylindrical portion 32 consists of an opening 33 of a predetermined size, which is located on the side corresponding to the side where the inner lug 35 is situated and which is spaced apart from the lugs 34 by an interval of 90 degrees. The opening 33 permits the pivoting portion 22 of the post 20 to extend therethrough. The swivel arm 30 is capable of turning in a range of 90 degrees by using the cylindrical portion 32 as a fulcrum. The positioning of the pivoting portion 22 can be restrained by the two end edges 331 and 332 of the opening 33. A caster 38 is mounted on the free end of the lugs 34. The inner lug 35 consists of a recess 351, a slant 352, and a baffle 353, which are situated in that order from the inner end toward the free end of the inner lug 35.

Figure 5:
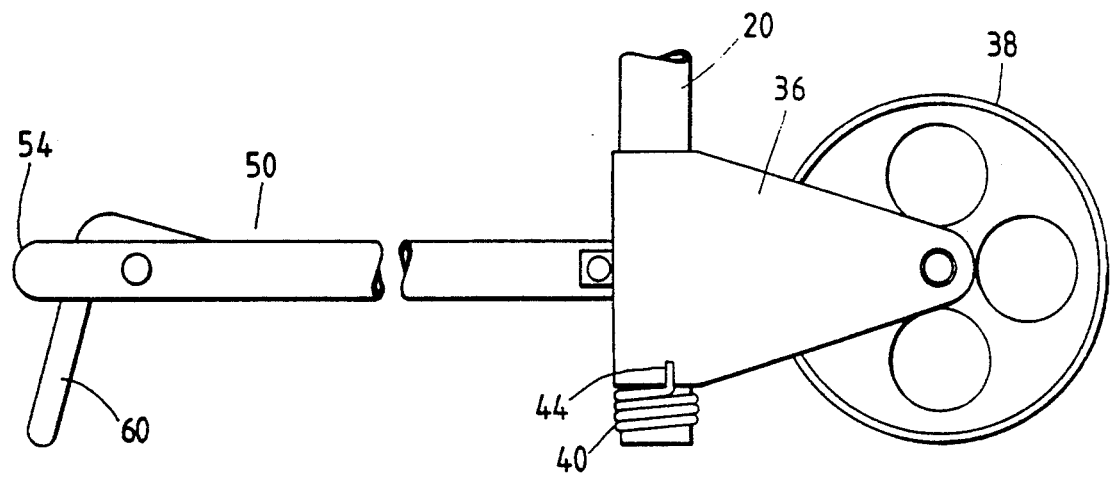
FIG. 5 shows a side view of the carriage rack in an unfolded state according to the present invention.

Two elastic elements 40 are torsion springs, each of which is fitted over the bottom end of the post 20 in such manners that its one end 42 is received in the round hole 201 of the post 20 and that its another end 44 urges the outer wall of the outer lug 36 so as to confine the swivel arm 30 to turn only in an inward direction, as shown in FIG. 5.

The luggage holding rod 50 has two upright legs 52, which are fastened to the posts 20 by means of nuts and bolts 53 that are received in the through holes 221 of the pivoting portions 22 of the posts 20. As a result, the luggage holding rod 50 is capable of turning by using the pivoting portions 22 as fulcrums so that the front end of each upright leg 52 of the luggage holding rod 50 urges the slant 352 of the lug 34 so as to cause the lug 34 to swivel outwards.

The bracket 60 of U-shaped construction has two ends, each of which is provided with a retaining portion 62 situated in a location adjacent to the abutment between the upright leg 52 and the horizontal segment 54 of the luggage holding rod 50. The bracket 60 is therefore capable of turning in relation to the luggage holding rod 50 and of being arrested and retained by the horizontal segment 54 of the luggage holding rod 50, as shown in FIG. 5.

Figure 3:
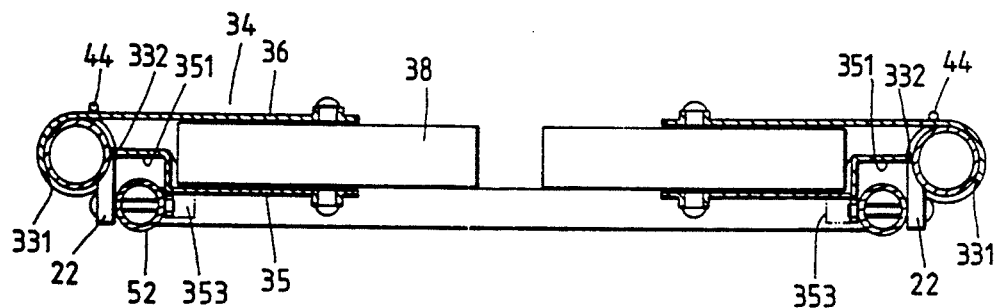
FIG. 3 shows a sectional view of a portion taken along the line 3—3 as shown in FIG. 1.

As illustrated in FIGS. 1 and 3, the carriage rack 10 of the present invention is shown being in a folded state, with the two posts 20, the luggage holding rod 50 and the bracket 60 being folded in an upright manner, and with the two swivel arms 30 being turned inwards so as to permit the two casters 38 to be received between the two posts 20. In addition, the two upright legs 52 of the luggage holding rod 50 are opposite to the recesses 351 of the lugs 34 so that the second end edge 332 of the opening 33 is stopped and retained by the pivoting portion 22 of the post 20 at such time when the lugs 34 are turned inwards to be in a folded state.

Figure 4:
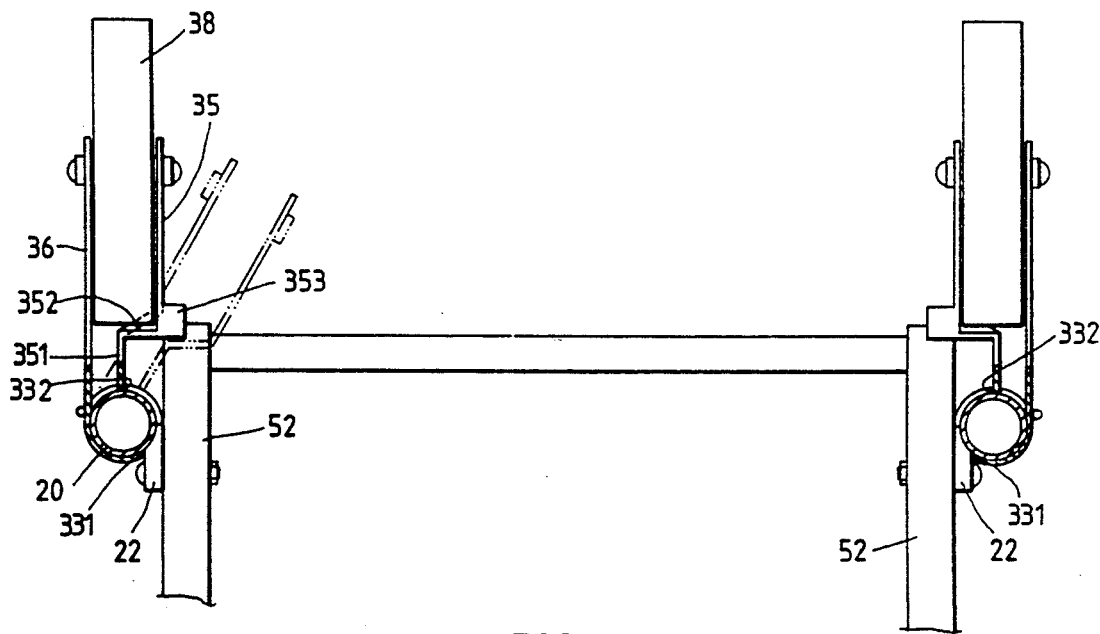
FIG. 4 is a top sectional view of the carriage rack as shown in FIG. 1, showing that the carriage rack is in an unfolded state.
Figure 6:
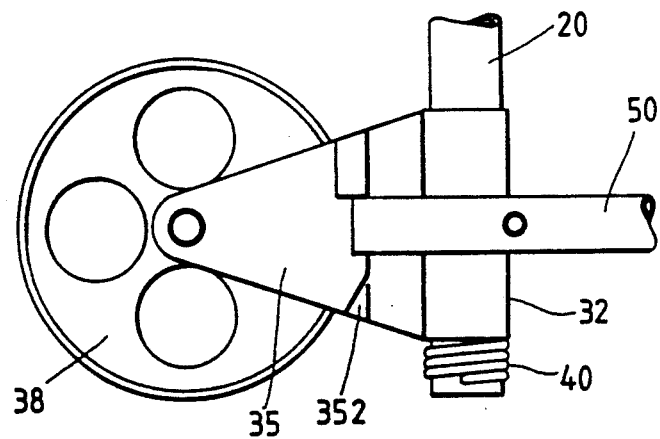
FIG. 6 is a schematic view showing that the luggage holding rod urges the swivel arms so as to permit the carriage rack of the present invention to spread out.

The process of opening up the folded carriage rack 10 of the present invention is illustrated in FIG. 4. The first step is to press downwards the luggage holding rod 50 to allow the luggage holding rod 50 to swivel downwards by using the pivoting portion 22 as a fulcrum. At the initial stage of opening up the folded carriage rack 10, the front ends of the two upright legs 52 urge the slants 352 of the inner lugs 35. As the downward swiveling of the luggage holding rod 50 is in progress, the areas of the slants 352 which are urged by the upright legs 52 become increasingly greater. As a result, the lugs 34 swivel further outwards by using the cylindrical portion 32 as a fulcrum. As soon as the luggage holding rod 50 has swiveled to an extent that it is perpendicular to the two posts 20, the front ends of the two upright legs 52 of the luggage holding rod 50 disengage the slants 352 of the inner lugs 35 and are subsequently retained by the baffles 353 located on the inner walls of the inner lugs 35, as shown in FIGS. 4 and 6. The first end edge 331 of the opening 33 of the swivel arm 30 urges the pivoting portion 22 so that the swivel arm 30 can not be turned outwards. Furthermore, the swivel arm 30 is held securely in place in view of the fact that the baffle 353 of the inner lug 35 of the swivel arm 30 engages securely the front end of the upright leg 52 of the luggage rod 50. As a result, the caster 38, which is mounted on the lugs 34 of the swivel arm 30, is capable of turning stably on the ground surface. The luggages are kept in the space between the luggage holding rod 50 and the two posts 20.

As shown in FIG. 5, the bracket 60 can be opened up outwards so as to permit its retaining portions 62 to be held by the horizontal segment 54 of the luggage holding rod 50. As a result, the carriage rack 10 can be upheld vertically on the ground.

In the process of folding the carriage rack 10 in an unfolded state, the luggage holding rod 50 is pulled upwards so as to relieve the two swivel arms 30 of being urged by the two upright legs 52 of the luggage holding rod 50. The swivel arms 30 are then driven by the two elastic elements 40 to swivel inwards until such time when the upright legs 52 of the luggage holding rod 50 are parallel to the two posts 20. In the meantime, the lugs 34 of the swivel arms 30 and the casters 38 are kept between the two posts. The bracket 60 is folded inwards so that the bracket 60, the posts 20, the luggage holding rod 50, and the swivel arms 30 are situated on the same vertical plane. In addition, the swivel arms 30 are held securely in place by means of the second end edges 332 of their openings 33, which are stopped and retained by the pivoting portions 22 of the posts 20. As shown in FIG. 1, such folded carriage rack 10 of the present invention is a handy thing to be carried around and stored without taking up too much of the storage space.

The embodiment of the present invention described above is to be considered in all respects as merely illustrative and not restrictive. Accordingly, the present invention may be embodied in other specific forms without deviating from the spirit thereof. The present invention is therefore to be limited only by the scope of the hereinafter appended claims.

What is claimed is:
1. A carriage rack, comprising:
(a) two posts spaced apart in a parallel manner and provided at inner sides of bottom ends thereof with pivoting portions facing each other;
(b) two swivel arms, each of which is provided with a cylindrical portion and with inner and outer lugs extending rearwards from said cylindrical portion, said cylindrical portion having an opening of a size located on the side corresponding to the side where said inner lug is situated, said inner lug having an inner wall provided with a recess, a slant and a baffle, said post being fitted over by said swivel arm in such a manner that said pivoting portion of said post extends out of said opening of said cylindrical portion so that said pivoting portion of said post is stopped and retained by two end edges of said opening at the time when said swivel arm makes a turn of 90 degrees;
(c) two elastic elements, each of which is fitted over the bottom end of a post;
(d) a luggage holding rod having two upright legs, which are respectively fastened to said pivoting portions of said posts in such manners that said upright legs urge said slants of said inner lugs of said swivel arms so as to permit said inner and outer lugs to swivel by using said cylindrical portions as fulcrums, and that said upright legs are stopped and retained by said baffles of said inner lugs at such time when said two upright legs of said luggage holding rod are perpendicular to said posts; and
(e) a bracket having two ends, which are respectively arranged near abutments between said upright legs of said luggage holding rod and a horizontal segment of said luggage holding rod.

2. The carriage rack of claim 1 wherein each of said elastic elements is a torsion spring having one end that is fastened to one of said posts and having another end which is in contact with said outer lug.

3. The carriage rack of claim 1 wherein said bracket has two ends, which are movably fastened to said luggage holding rod in such a manner that they can be stopped and retained by said horizontal segment of said luggage holding rod.

* * * * *